United States Patent
Jeon

(10) Patent No.: US 12,387,885 B2
(45) Date of Patent: Aug. 12, 2025

(54) SWITCH CONTROL DEVICE, AND BATTERY PACK AND VEHICLE INCLUDING THE SAME

(71) Applicant: SAMSUNG SDI CO., LTD., Yongin-si (KR)

(72) Inventor: Hyuncheol Jeon, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 18/488,887

(22) Filed: Oct. 17, 2023

(65) Prior Publication Data
US 2024/0297001 A1    Sep. 5, 2024

(30) Foreign Application Priority Data
Mar. 3, 2023   (KR) .................. 10-2023-0028669

(51) Int. Cl.
*H01H 9/54*   (2006.01)
*B60R 16/033*   (2006.01)
*B60L 50/60*   (2019.01)

(52) U.S. Cl.
CPC ............. *H01H 9/54* (2013.01); *B60R 16/033* (2013.01); *B60L 50/60* (2019.02)

(58) Field of Classification Search
CPC ................................ H01H 9/54; B60R 16/033
See application file for complete search history.

(56) References Cited

U.S. PATENT DOCUMENTS

| | | | | |
|---|---|---|---|---|
| 4,387,332 A | * | 6/1983 | Oyamada ............... | H02J 7/0024 320/124 |
| 10,746,802 B2 | * | 8/2020 | Cho .................... | G01R 31/3842 |
| 2015/0192630 A1 | * | 7/2015 | Tsukamoto ............ | G01R 31/40 324/426 |

(Continued)

FOREIGN PATENT DOCUMENTS

| | | |
|---|---|---|
| FR | 3126209 A1 | 8/2017 |
| JP | 2015-217911 A | 12/2015 |

(Continued)

OTHER PUBLICATIONS

European Search Report for EP Patent Application No. 23206216.6 dated Apr. 9, 2024, 7 pages.

*Primary Examiner* — Jared Fureman
*Assistant Examiner* — Esayas G Yeshaw
(74) *Attorney, Agent, or Firm* — Womble Bond Dickinson (US) LLP

(57) ABSTRACT

A switch control device includes: a controller to output a control signal for controlling opening and closing of a switch; a switch driver to output a driving signal to the switch according to the control signal to control the opening and closing of the switch; and a counter connected between an output terminal of the switch driver and the switch, the counter to: receive a state signal from the controller indicating an operating state of the controller; and count a number of times that the switch is operated in an open state or a closed state by the driving signal when the state signal indicates the operating state of the controller as an abnormal state. The controller is further to detect a malfunction of the switch while the controller operates in the abnormal state based on the count.

7 Claims, 3 Drawing Sheets

(56) References Cited

U.S. PATENT DOCUMENTS

| | | | |
|---|---|---|---|
| 2015/0295282 A1* | 10/2015 | Rogers | H02H 7/18 |
| | | | 307/112 |
| 2016/0154716 A1* | 6/2016 | Lee | G06F 1/30 |
| | | | 714/14 |
| 2019/0193589 A1* | 6/2019 | Toriumi | H01M 8/04567 |
| 2019/0244779 A1 | 8/2019 | Nagai et al. | |

FOREIGN PATENT DOCUMENTS

| | | |
|---|---|---|
| JP | 2018-156859 A | 10/2018 |
| KR | 20-0291562 Y1 | 11/2002 |

\* cited by examiner

SWITCH CONTROL DEVICE, AND BATTERY PACK AND VEHICLE INCLUDING THE SAME

CROSS-REFERENCE TO RELATED APPLICATIONS

This application claims priority to and the benefit of Korean Patent Application No. 10-2023-0028669, filed on Mar. 3, 2023, in the Korean Intellectual Property Office, the entire content of which is incorporated by reference herein.

BACKGROUND

1. Field

Aspects of embodiments of the present disclosure relate to a switch control device, and a battery pack and a vehicle including the same.

2. Description of Related Art

As environmental regulations, such as $CO_2$ regulations and/or the like, have been recently strengthened, interest in environmentally-friendly vehicles have increased. Therefore, automobile companies are actively conducting research and product development on a pure electric vehicle or a hydrogen vehicle, as well as on a hybrid vehicle or a plug-in hybrid vehicle.

A high-voltage battery pack may be applied to the environmentally-friendly vehicle to store electric energy obtained from various suitable energy sources. A high-voltage electrical system of the vehicle may use high-voltage electric energy provided from a high-voltage battery as the driving or electrical energy of the vehicle.

The above information disclosed in this Background section is for enhancement of understanding of the background of the present disclosure, and therefore, it may contain information that does not constitute prior art.

SUMMARY

An output of a high-voltage battery pack may be transferred to or blocked from a load by a high-voltage switch, such as a relay, a contactor, or the like. An abnormal operation of the high-voltage switch, such as chattering or the like, may cause welding of a contact to greatly affect the lifespan of the high-voltage switch. The abnormal operation of the high-voltage switch may be monitored and detected by a controller, such as a microcontroller or the like. However, when the controller abnormally operates due to a reset or the like, the abnormal operation of the high-voltage switch may not be suitably detected.

One or more embodiments of the present disclosure are directed to a switch control device capable of detecting a malfunction of a high-voltage switch that may occur in a section where a controller abnormally operates, and a battery pack and a vehicle including the switch control device.

According to one or more embodiments of the present disclosure, a switch control device includes: a controller configured to output a control signal for controlling opening and closing of a switch; a switch driver configured to output a driving signal to the switch according to the control signal to control the opening and closing of the switch; and a counter connected between an output terminal of the switch driver and the switch, the counter being configured to: receive a state signal from the controller indicating an operating state of the controller; and count a number of times that the switch is operated in an open state or a closed state by the driving signal when the state signal indicates the operating state of the controller as an abnormal state. The controller is further configured to detect a malfunction of the switch while the controller operates in the abnormal state based on the count.

In an embodiment, the switch may include a relay or a contactor configured to be opened or closed according to energization of a coil included in the switch, and the switch driver may be configured to output the driving signal to at least one of opposite ends of the coil.

In an embodiment, the counter may be connected to the output terminal of the switch driver, or to one of the opposite ends of the coil.

In an embodiment, the state signal may include a reset signal of the controller, and the counter may be further configured to start or end the count of the number of times that the switch is operated in an open state or a closed state according to the reset signal.

In an embodiment, the controller may be further configured to determine that a failure occurs in the switch driver when the count is greater than or equal to a threshold value.

In an embodiment, a battery pack may include: a battery; the switch configured to control an electrical connection between the battery and a load; and the switch control device configured to control the switch.

In an embodiment, a vehicle may include: the battery pack; and the load configured to receive electric power from the battery pack.

According to one or more embodiments of the present disclosure, a malfunction of a high-voltage switch that may occur in a section in which a controller abnormally operates may be detected.

BRIEF DESCRIPTION OF THE DRAWINGS

The above and other aspects and features of the present disclosure will be more clearly understood from the following detailed description of the illustrative, non-limiting embodiments with reference to the accompanying drawings.

DETAILED DESCRIPTION

Figure 1:
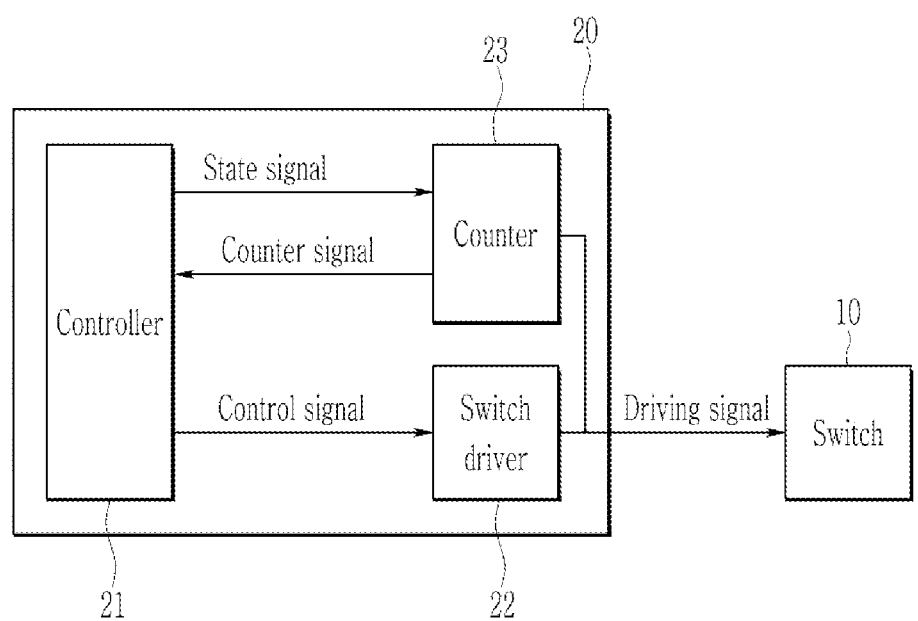
FIG. 1 schematically illustrates a switch control device according to an embodiment.

Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, redundant description thereof may not be repeated.

When a certain embodiment may be implemented differently, a specific process order may be different from the described order. For example, two consecutively described processes may be performed at the same or substantially at the same time, or may be performed in an order opposite to the described order.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. Similarly, when a layer, an area, or an element is referred to as being "electrically connected" to another layer, area, or element, it may be directly electrically connected to the other layer, area, or element, and/or may be indirectly electrically connected with one or more intervening layers, areas, or elements therebetween. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, the expression "A and/or B" denotes A, B, or A and B. Expressions such as "at least one of," when preceding a list of elements, modify the entire list of elements and do not modify the individual elements of the list. For example, the expression "at least one of a, b, or c," "at least one of a, b, and c," and "at least one selected from the group consisting of a, b, and c" indicates only a, only b, only c, both a and b, both a and c, both b and c, all of a, b, and c, or variations thereof.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 schematically illustrates a switch control device according to an embodiment.

Referring to FIG. 1, the switch control device 20 according to an embodiment may include a controller 21, a switch driver 22, and a counter 23. The switch control device 20 may be electrically connected to a switch 10.

The controller 21 may output a control signal for controlling the opening and closing of the switch 10 to the switch driver 22. The controller 21 may output a state signal (e.g., a reset signal) indicating an operating state of the controller 21 to the counter 23. The controller 21 may be configured as a processor, such as a microprocessor, a microcontroller, a central processing unit (CPU), a processor core, a multiprocessor, an application-specific integrated circuit (ASIC), a field-programmable gate array (FPGA), or the like, having a physically structured circuit to perform a function represented by a code or a command included in a program.

The state of the controller 21 may be monitored by a watchdog component inside the controller 21 or a watchdog circuit outside the controller 21. The watchdog component or the watchdog circuit may reset the controller 21 if an abnormal state of the controller 21 is detected. As reset, the controller 21 may output the state signal indicating an abnormal state until it returns to the normal state.

The switch driver 22 may output a driving signal for controlling the opening and closing of the switch 10 according to the control signal received from the controller 21. The switch 10 may be configured as a switch element in which a contact state (a closed state of the switch 10) and a non-contact state (an open state of the switch 10) of contacts thereof are controlled by whether or not a coil is energized. For example, the switch element may include a relay, a contactor, or the like. In this case, the switch driver 22 may be connected to at least one of opposite ends (e.g., both ends) of the coil for operating the switch 10 to control the opening and closing of the switch 10 by controlling energization of the coil using the driving signal.

The counter 23 may receive the state signal of the controller 21 from the controller 21. The counter 23 may be connected between an output terminal of the switch driver 22 and the switch 10 (e.g., the counter 23 may be connected to the output terminal of the switch driver 22 or to one of opposite ends (e.g., both ends) of the coil of the switch 10) to count the number of times (hereinafter referred to as the number of switch operations) that the switch 10 is operated in an open state or a closed state in response to the driving signal output from the switch driver 22. The counter 23 may start or end counting the number of switch operations according to the state signal of the controller 21. The counter 23 may start counting the number of switch operations if the state signal received from the controller 21 indicates that the controller 21 enters an abnormal state (e.g., a reset state). The counter 23 may end counting of the number of switch operations if the state signal received from the controller 21 indicates that the controller 21 returns to a normal state.

The counter 23 may output to the controller 21 information on the number of switch operations counted while the controller 21 operates in the abnormal state. The controller 21 receiving the information on the number of switch operations may detect an abnormal operation of the switch 10 based on the number of switch operations. If the number of switch operations is greater than or equal to a threshold value, the controller 21 may determine that a failure occurs in the switch driver 22, and may notify an upper controller (e.g., a controller of a system (e.g., a vehicle) at which the battery pack 100 is mounted) of the failure.

If the controller (21) operates in an abnormal state, the switch driver (22) may not change the status of the switch (10) or may change it once. For example, if the controller (21) operates in an abnormal state, the switch driver (22) may maintain the previous state of the switch (10) for a certain period of time. For example, if the controller (21) operates in an abnormal state, the switch driver (22) may change the state of the switch (10) once (for example, changing from a closed state to an open state). The operation of the switch driver (22) while the controller (21) operates in an abnormal state may vary depending on the configuration of the switch driver (22). Therefore, the threshold value may be determined according to the configuration of the switch driver (22). The threshold value may be set to 1 or 2. If chattering occurs, the switch (10) may operate multiple times, so the threshold value man be set to a value greater than 2 to prevent misrecognition.

Figure 2:
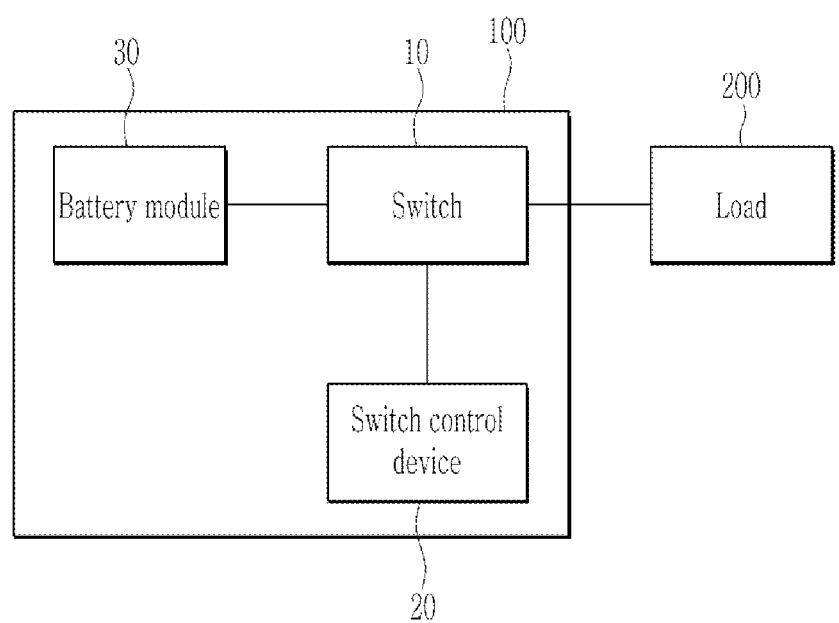
FIG. 2 schematically illustrates a vehicle including the switch control device according to an embodiment.

FIG. 2 schematically illustrates a vehicle including the switch control device 20 according to an embodiment.

Referring to FIG. 2, the vehicle may include a battery pack 100, and a load 200 for receiving electric power from the battery pack 100. The battery pack 100 may include the switch 10, the switch control device 20, and a battery module (e.g., a battery) 30.

The battery module 30 may include cells (e.g., battery cells) connected in series or parallel to each other.

The switch 10 may control an electrical connection between the battery module 30 and the load 200. The switch 10 may include a contactor, a relay, or the like.

The switch control device 20 may control an open state or a closed state of the switch 10. As described above with reference to FIG. 1, the switch control device 20 may include the controller 21, the switch driver 22, and the counter 23.

The controller 21 of the switch control device 20 may be a battery management system (BMS) of the battery pack 100. In this case, the controller 21 may output the state signal indicating the operating state of the controller 21, the control signal for controlling the opening and closing of the switch 10, and the like based on state information of the battery module 30, state information of a system (e.g., the vehicle) at which the battery pack 100 is mounted, a driving mode, or the like. For example, the controller 21 may determine whether the switch 10 is opened or closed according to a state of the battery pack 100 or a state of the system (e.g., the vehicle) at which the battery pack 100 is mounted, and may output, to the switch 10, the control signal for controlling the opening and closing of the switch 10.

The switch 10 mounted at the battery pack 100 may abnormally operate due to various factors, such as an inrush current, high current conduction, power noise, a malfunction of the switch driver 22, and/or the like, even while the controller 21 abnormally operates. As described above, the switch control device 20 may detect the number of times that the switch 10 is abnormally opened or closed while the controller 21 abnormally operates, and may detect the abnormal operation of the switch 10 based on the detected number of times.

The controller 21 of the switch control device 20 may detect a malfunction of the switch 10 while the controller 21 abnormally operates based on the information on the number of switch operations received from the counter 23. If the malfunction of the switch 10 is detected, the switch control device 20 may notify a controller of the system (e.g., the vehicle) at which the battery pack 100 is mounted of information on the detected malfunction of the switch 10. If the number of switch operations counted while the controller 21 abnormally operates is greater than or equal to a threshold value, the switch control device 20 may determine that a failure occurs in the switch driver 22, and may notify the controller of the system (e.g., the vehicle) at which the battery pack 100 is mounted of the failure of the switch driver 22.

Figure 3:
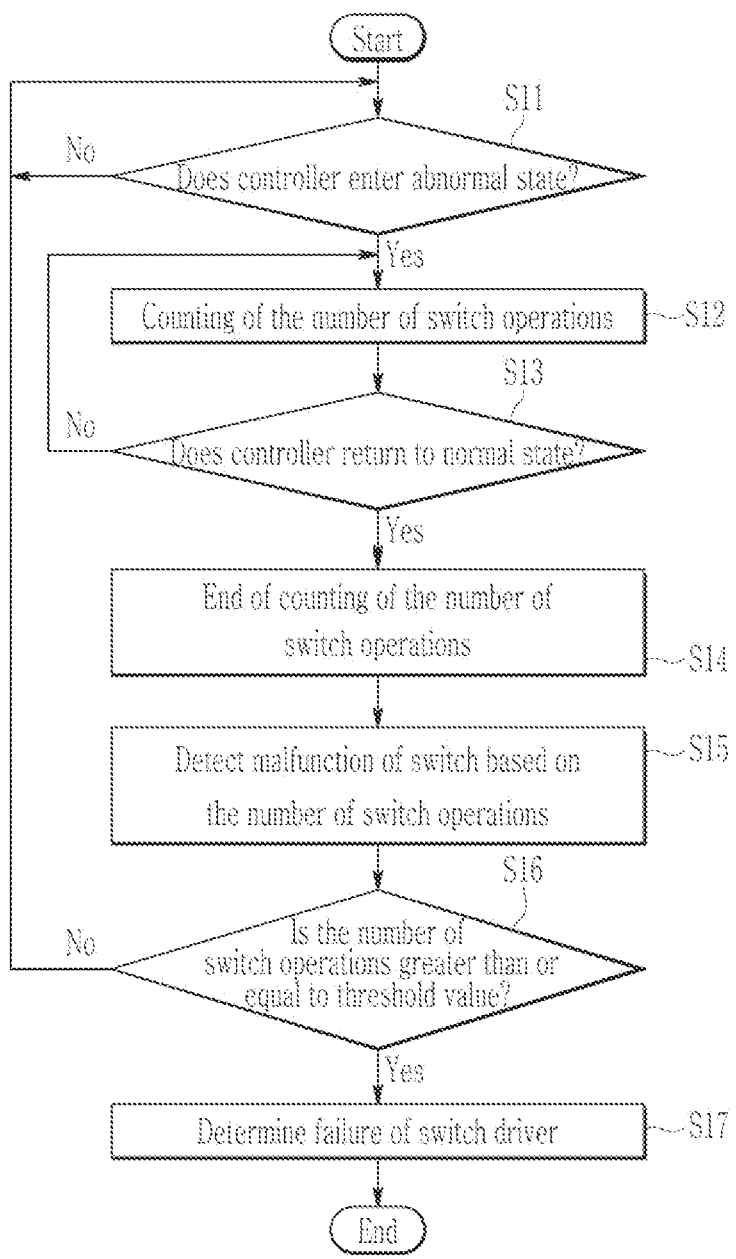
FIG. 3 schematically illustrates an operating method of the switch control device according to an embodiment.

FIG. 3 schematically illustrates an operating method of the switch control device 20 according to an embodiment.

Referring to FIG. 3, the switch control device 20 according to an embodiment may determine whether the controller 21 enters the abnormal state based on the state signal (e.g., the reset signal) output from the controller 21 (e.g., at block S11). If the controller 21 enters the abnormal state (e.g., YES at block S11), the switch control device 20 may count the number of switch operations (e.g., at block S12). The number of switch operations is the number of times that the switch 10 is operated in the open state or the closed state by the driving signal output from the switch driver 22.

Thereafter, if it is confirmed that the controller 21 returns to the normal state based on the state signal output from the controller 21 at block S13 (e.g., YES at block S13), the switch control device 20 may end the counting of the number of switch operations (e.g., at block S14). In addition, the switch control device 20 may detect the malfunction of the switch 10 while the controller 21 operates in the abnormal state based on the counted number of switch operations (e.g., at block S15). If the counted number of switch operations is greater than or equal to a threshold value at block S16 (e.g., YES at block S16), the switch control device 20 may determine that a failure of the switch driver 22 occurs, rather than a temporary malfunction of the switch driver 22 (e.g., at block S17). In this case, the switch control device 20 may notify an upper controller (e.g., a controller of a system (e.g., a vehicle) at which the battery pack 100 is mounted) of a system at which the switch control device 20 is installed of the failure.

The electronic or electric devices and/or any other relevant devices or components according to embodiments of the present disclosure described herein (e.g., the controller, the counter, the switch driver, the switch control device, and/or the like) may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. The electrical or mutual connections described above may, for example, be realized by the PCB, wires on different types of circuit carriers, or conductive elements. The conductive elements may, for example, include metallizations, such as surface metallizations, and/or pins, and may include conductive polymers or ceramics.

In addition, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the example embodiments of the present disclosure.

Further, a person having ordinary skill in the art will understand that various functions of the computing device may be combined or united to a single computing device, or functions of a specific computing device may be dispersed to at least another computing device, while not digressing from the range of the embodiments of the present disclosure.

The foregoing is illustrative of some embodiments of the present disclosure, and is not to be construed as limiting thereof. Although some embodiments have been described, those skilled in the art will readily appreciate that various modifications are possible in the embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific embodiments disclosed herein, and that various modifications to the disclosed embodiments, as well as other example embodiments, are intended to be included within the spirit and scope of the present disclosure as defined in the appended claims, and their equivalents.

DESCRIPTION OF SYMBOLS

10: switch
20: switch control device
21: controller
22: switch driver
23: counter
100: battery pack
200: load

What is claimed is:

1. A switch control device comprising:
a controller configured to output a control signal for controlling opening and closing of a switch;
a switch driver configured to output a driving signal to the switch according to the control signal to control the opening and closing of the switch; and
a counter connected between an output terminal of the switch driver and the switch, the counter being configured to:
receive a state signal from the controller indicating an operating state of the controller; and
count a number of times that the switch is operated in an open state or a closed state by the driving signal when the state signal indicates the operating state of the controller as an abnormal state,
wherein the controller is further configured to detect a malfunction of the switch while the controller operates in the abnormal state based on the count.

2. The switch control device as claimed in claim 1, wherein the switch comprises a relay or a contactor configured to be opened or closed according to energization of a coil included in the switch, and
wherein the switch driver is configured to output the driving signal to at least one of opposite ends of the coil.

3. The switch control device as claimed in claim 2, wherein the counter is connected to the output terminal of the switch driver, or to one of the opposite ends of the coil.

4. The switch control device as claimed in claim 1, wherein the state signal comprises a reset signal of the controller, and
wherein the counter is further configured to start or end the count of the number of times that the switch is operated in an open state or a closed state according to the reset signal.

5. The switch control device as claimed in claim 1, wherein the controller is further configured to determine that a failure occurs in the switch driver when the count is greater than or equal to a threshold value.

6. A battery pack comprising:
a battery;
the switch configured to control an electrical connection between the battery and a load; and
the switch control device according to claim 1 configured to control the switch.

7. A vehicle comprising:
the battery pack according to claim 6; and
the load configured to receive electric power from the battery pack.

* * * * *